(12) United States Patent
Utagawa

(10) Patent No.: US 8,760,470 B2
(45) Date of Patent: Jun. 24, 2014

(54) MIXED REALITY PRESENTATION SYSTEM

(75) Inventor: Tsutomu Utagawa, Yokohama (JP)

(73) Assignee: Canon Kabushiki Kaisha (JP)

( * ) Notice: Subject to any disclaimer, the term of this patent is extended or adjusted under 35 U.S.C. 154(b) by 956 days.

(21) Appl. No.: 12/507,270

(22) Filed: Jul. 22, 2009

(65) Prior Publication Data

US 2010/0026714 A1 Feb. 4, 2010

(30) Foreign Application Priority Data

Jul. 31, 2008 (JP) ................................ 2008-198617

(51) Int. Cl.
  *G09G 5/00* (2006.01)
(52) U.S. Cl.
  USPC ............................ 345/633; 345/632; 345/419
(58) Field of Classification Search
  USPC ................. 345/629, 633, 632, 630, 428, 419; 382/154
  See application file for complete search history.

(56) References Cited

U.S. PATENT DOCUMENTS

| | | | |
|---|---|---|---|
| 6,774,898 B1 * | 8/2004 | Katayama et al. | 345/428 |
| 7,613,356 B2 * | 11/2009 | Uchiyama et al. | 345/633 |
| 2004/0131232 A1 * | 7/2004 | Meisner et al. | 382/103 |
| 2005/0156817 A1 | 7/2005 | Iba | |

FOREIGN PATENT DOCUMENTS

JP 2004-109994 A 4/2004

OTHER PUBLICATIONS

Florencio, Dinei et al., "Multiview Video Compression and Streaming Based on Predicted Viewer Position", ICASSP, Microsoft Research, 2009, p. 1-4.*

* cited by examiner

*Primary Examiner* — Chante Harrison
(74) *Attorney, Agent, or Firm* — Rossi, Kimms & McDowell LLP

(57) ABSTRACT

An image composition unit outputs a composition image of a physical space and virtual space to a display unit. The image composition unit calculates, as difference information, a half of the difference between an imaging time of the physical space and a generation completion predicted time of the virtual space. The difference information and acquired position and orientation information are transmitted to an image processing apparatus. A line-of-sight position prediction unit updates previous difference information using the received difference information, calculates, as the generation completion predicted time, a time ahead of a receiving time by the updated difference information, and predicts the position and orientation of a viewpoint at the calculated generation completion predicted time using the received position and orientation information. The virtual space based on the predicted position and orientation, and the generation completion predicted time are transmitted to a VHMD.

6 Claims, 9 Drawing Sheets

MIXED REALITY PRESENTATION SYSTEM

BACKGROUND OF THE INVENTION

1. Field of the Invention

The present invention relates to a composition technique of a physical space image and virtual space image.

2. Description of the Related Art

In recent years, as a technique for seamlessly merging a physical world and virtual world in real time, a so-called MR (Mixed Reality) technique is known. As systems that implement the MR technique, two systems have been mainly proposed. One is an MR system using an optical see-through HMD (Head Mounted Display), and the other is an MR system using a video see-through HMD. The system using the optical see-through HMD presents, to the HMD user, an MR image generated by superimposing a CG (Computer Graphics) image onto an image of the physical space observed by the HMD user and formed on the pupils of the user via an optical system. The system using the video see-through HMD presents, to the HMD user, an MR image generated by superimposing a CG image onto an image obtained by sensing an object that nearly matches an object observed from the pupil position of the HMD user using a video camera or the like.

Either of these MR systems detects the position and orientation of the viewpoint of the HMD user by making arithmetic processing of an output signal from a sensor and the like mounted on the HMD using a PC or the like. Each system generates a CG image to be superimposed at a predetermined position of the physical space observed by the HMD user based on the detection result in the PG, and composites the generated CG image on a physical image using, for example, a chroma-key composition method. In this manner, the aforementioned MR system enhances the sense of reality. However, the detection of the position and orientation of the viewpoint of the HMD user, and the generation of a CG image require a lot of time. Therefore, when a CG image is to be composited on a physical space image which requires little processing time, a dynamic registration error occurs between these images. Especially, when the orientation (direction) of the viewpoint of the HMD user has changed, an error associated with a relative position between the physical space image and CG image due to the dynamic registration error occurs, thus impairing the sense of reality.

To solve such a problem, patent reference 1 has proposed the following method. That is, the head azimuth direction of the HMD user is detected, and a CG image is shifted in the horizontal and vertical directions by the moving amount of the head of the HMD user within a time required to generate the CG image based on the detection result, and is then composited on a physical space image.

[Patent Reference 1] Japanese Patent Laid-Open No. 2004-109994

However, the aforementioned related art suffers the following problem.

When a CG image to be composited on a physical space image is a three-dimensional object, an inconsistency occurs between the stereoscopic angle that represents the depth of the CG image and the composition position on the physical space image if the CG image is merely shifted in the horizontal and vertical directions by the moving amount of the head of the HMD user within the time required to generate the CG image. For this reason, the sense of reality is impaired.

SUMMARY OF THE INVENTION

The present invention has been made in consideration of the aforementioned problems, and provides a technique that naturally composites a physical space image and virtual space image.

According to the first aspect of the present invention, a mixed reality presentation system including: a head mounted display having an imaging unit which senses an image of a physical space, and a display unit which displays an image; and an image processing apparatus which generates an image to be displayed on the display unit, wherein the head mounted display comprises: a composition unit which generates a composition image by compositing a physical space image sensed by the imaging unit and a virtual space image transmitted from the image processing apparatus; a unit which outputs the composition image to the display unit; a calculation unit which calculates a difference between an imaging time of the physical space image and a generation completion predicted time of the virtual space image transmitted from the image processing apparatus, and calculates, as difference information, a result by multiplying the calculated difference by a ratio which is set in advance; a unit which acquires position and orientation information indicating a position and orientation of a viewpoint; and a transmission unit which transmits the difference information and the position and orientation information to the image processing apparatus, and the image processing apparatus comprises: a prediction unit which receives an information group transmitted from the transmission unit, updates previous difference information using the received difference information, calculates, as the generation completion predicted time, a time ahead of a receiving time of the information group by a time indicated by the updated difference information, and predicts a position and orientation of the viewpoint at the calculated generation completion predicted time using the received position and orientation information; a generation unit which generates a virtual space image based on the viewpoint having the position and orientation predicted by the prediction unit; and a unit which transmits the generation completion predicted time calculated by the prediction unit and the virtual space image generated by the generation unit to the head mounted display.

According to the second aspect of the present invention, a mixed reality presentation system including: a head mounted display having an imaging unit which senses an image of a physical space, and a display unit which displays an image; and an image processing apparatus which generates an image to be displayed on the display unit, wherein the head mounted display comprises: a composition unit which generates a composition image by compositing a physical space image sensed by the imaging unit and a virtual space image transmitted from the image processing apparatus; a unit which outputs the composition image to the display unit; a calculation unit which calculates, as difference information, a difference between a count value of the physical space image counted by a counter which increments the count value by 1 every time the imaging unit senses an image, and a count value for the virtual space image transmitted from the image processing apparatus; a correction unit which updates the difference information by correcting the difference information to $\frac{1}{2}$ when a value indicated by the difference information is not less than 1, to $-\frac{1}{2}$ when the value is not more than $-1$, and to 0 when the value is larger than $-1$ and less than 1; an acquisition unit which acquires position and orientation information from a sensor which measures a position and orientation of a viewpoint at a rate twice a frame rate of the imaging unit, and acquires a count value of the position and orientation information counted by a counter which increments the count value by $\frac{1}{2}$ every time the sensor performs the measurement; and a transmission unit which transmits the difference information updated by the correction unit, the position and orientation information, and the count value of the position and orientation information to the image processing apparatus, and the image processing apparatus comprises: a reception unit which receives an information group transmitted from the transmission unit; a generation unit which generates a virtual space image based on the information group received by the reception unit, and which calculates, as a count result, a count value obtained by incrementing a count value by 1 every time the generation unit generates the virtual space image, and adding the difference information received by the reception unit to the incremented count value, specifies position and orientation information received by the reception unit together with a count value having the same value as the calculated count value, and generates a virtual space image based on a viewpoint having a position and orientation indicated by the specified position and orientation information; and a unit which transmits the virtual space image generated by the generation unit and the count value calculated as the count result by the generation unit with respect to that virtual space image to the head mounted display.

According to the third aspect of the present invention, a mixed reality presentation system including: a head mounted display having a display unit which displays an image; and an image processing apparatus which generates an image to be displayed on the display unit, wherein the head mounted display comprises: a unit which outputs a virtual space image transmitted from the image processing apparatus to the display unit; a calculation unit which calculates a difference between a current time and a generation completion predicted time of the virtual space image transmitted from the image processing apparatus, and calculates, as difference information, a result by multiplying the calculated difference by a ratio which is set in advance; a unit which acquires position and orientation information indicating a position and orientation of a viewpoint; and a transmission unit which transmits the difference information and the position and orientation information to the image processing apparatus, and the image processing apparatus comprises: a prediction unit which receives an information group transmitted from the transmission unit, updates previous difference information using the received difference information, calculates, as the generation completion predicted time, a time ahead of a receiving time of the information group by a time indicated by the updated difference information, and predicts a position and orientation of the viewpoint at the calculated generation completion predicted time using the received position and orientation information; a generation unit which generates a virtual space image based on the viewpoint having the position and orientation predicted by the prediction unit; and a unit which transmits the generation completion predicted time calculated by the prediction unit and the virtual space image generated by the generation unit to the head mounted display.

Further features of the present invention will become apparent from the following description of exemplary embodiments with reference to the attached drawings.

DESCRIPTION OF THE EMBODIMENTS

Embodiments of the present invention will be described in detail hereinafter with reference to the accompanying drawings. Note that these embodiments will be explained as examples of the arrangements of the invention described in the scope of claims, and that invention is not limited to the embodiments to be described hereinafter.

First Embodiment

Figure 14:
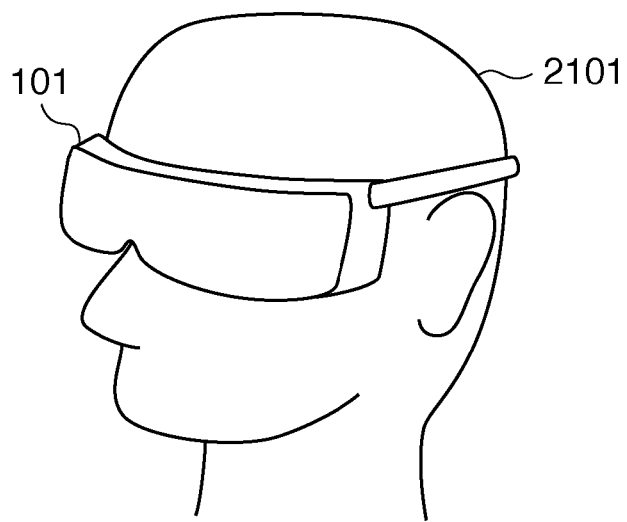
FIG. 14 is a view showing a state in which an HMD user 2101 wears the VHMD 101.

An HMD as a head mounted display used in this embodiment will be described first. FIG. 14 is a view showing a state in which an HMD user 2101 wears a video see-through HMD (to be referred to as a VHMD hereinafter) 101. The VHMD 101 incorporates a three-dimensional (3D) position and orientation sensor (not shown) used to measure the position and orientation of the viewpoint of the HMD user 2101. The 3D position and orientation sensor includes a gyro sensor, acceleration sensor, and magnetic sensor. In addition, the VHMD 101 includes an imaging unit for sensing a moving image of a physical space, and a display unit for displaying an image.

Figure 4:
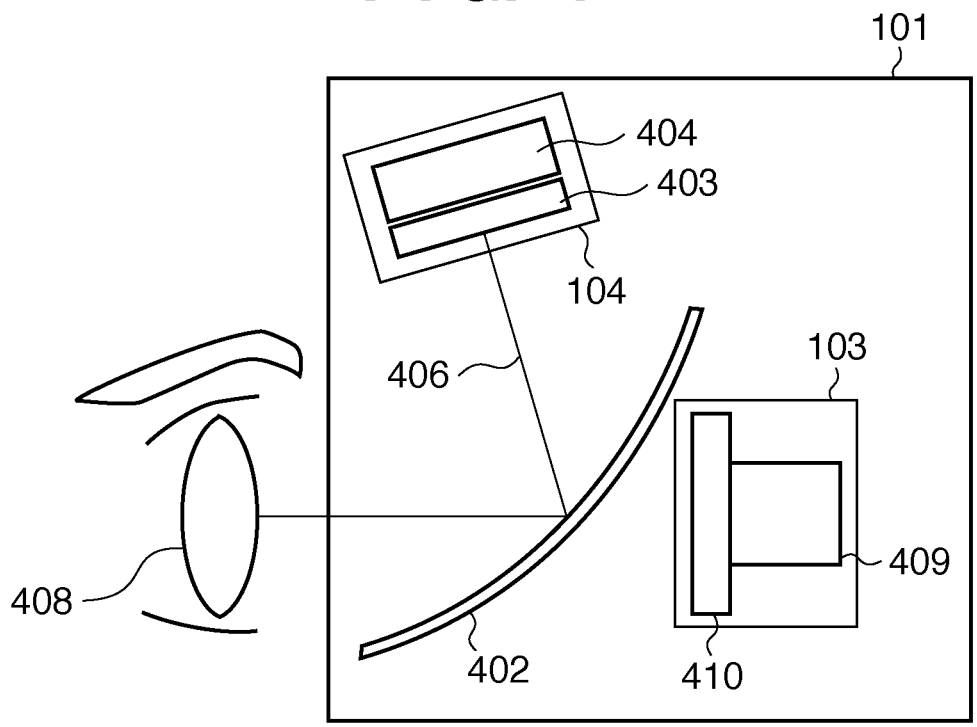
FIG. 4 is a side sectional view showing an example of the internal arrangement of a video see-through HMD (to be referred to as a VHMD hereinafter) 101.

FIG. 4 is a side sectional view showing an example of the internal arrangement of the VHMD 101.

Since the VHMD 101 has a symmetric shape, FIG. 4 illustrates the internal arrangement for one eye. Reference numeral 408 denotes an eye of the HMD user 2101. Reference numeral 103 denotes an imaging unit which includes an imaging optical system 409 and image sensor 410. The imaging optical system 409 forms an image of a physical space on the image sensor 410. Reference numeral 104 denotes a display unit which includes a liquid crystal panel 403 and backlight 404. The display unit 104 displays a composition image generated by compositing a virtual space image (to be described later) on an image (sensed image) formed on the image sensor 410. The backlight 404 illuminates the liquid crystal panel 403 with light. Then, an image displayed on the liquid crystal panel 403 is emitted as a light beam 406 onto a convex mirror 402. The convex mirror 402 reflects the light beam 406 emitted by the liquid crystal panel 403, and forms an image on the eye 408 of the HMD user 2101.

As a result, the composition image is presented to a position in front of the eye of the HMD user 2101.

A system according to this embodiment will be described below.

Figure 1:
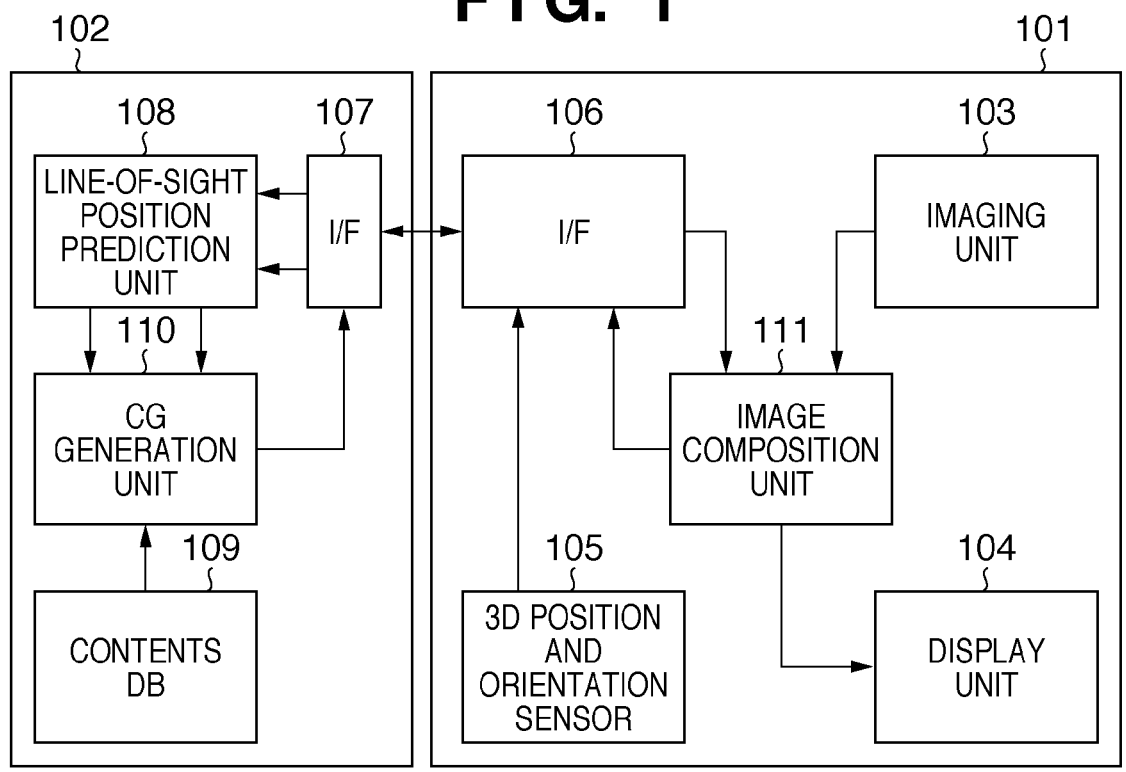
FIG. 1 is a block diagram showing an example of the functional arrangement of a system according to the first embodiment of the present invention.

FIG. 1 is a block diagram showing an example of the functional arrangement of a system according to this embodiment. As shown in FIG. 1, the system according to this embodiment includes an image processing apparatus 102 and the VHMD 101, which are connected to make data communications with each other. A connection mode is not particularly limited, and they may be connected via either a wired or wireless communication.

The VHMD 101 will be described first. As shown in FIG. 1, the VHMD 101 includes the imaging unit 103, the display unit 104, an image composition unit 111, an I/F (interface) 106, and a 3D position and orientation sensor 105. Assume that both the imaging unit 103 and display unit 104 operate to sense and display 60 still images per sec (60 fps) in the following description.

The imaging unit 103 is attached to the VHMD 101 to be able to sense a moving image of the physical space in the line-of-sight direction of the user from the vicinity of the eye of the user who wears the VHMD 101 on the head, and includes a video camera. Note that the imaging unit 103 includes two pairs of image sensors and optical systems for the right and left eyes used to generate stereoscopic images, and a DSP used to execute subsequent image processing. However, since the right and left units perform the same operations, FIG. 1 illustrates the unit for only one eye.

The imaging unit 103 senses a moving image of the physical space, and measures an imaging time of each frame image (physical space image) which forms the moving image. The imaging unit 103 outputs each sensed frame image and imaging time information indicating the imaging time of that frame to the image composition unit 111. Various output methods upon outputting one physical space image from the imaging unit 103 and the imaging time information of that physical space image are available. In this embodiment, the imaging time information is superimposed on a partial region of the physical space image.

Figure 9:
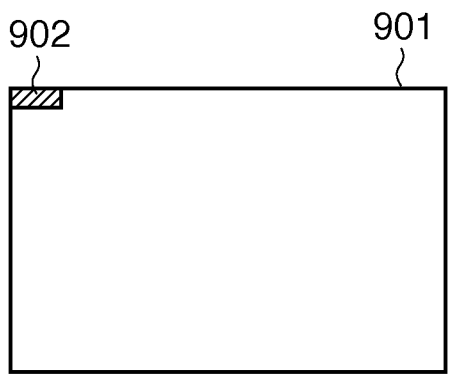
FIG. 9 is a view for explaining a method of superimposing imaging time information of a physical space image on that physical space image.

FIG. 9 is a view for explaining a method of superimposing imaging time information of a physical space image on that physical space image. Referring to FIG. 9, reference numeral 901 denotes a physical space image. For example, when the physical space is sensed using an image sensor having an SXGA size, this physical space image 901 has a size of 1240 pixels×1024 pixels. Reference numeral 902 denotes a region where the imaging time information is to be superimposed (embedded) in the uppermost line of this physical space image 901. This region includes first several pixels of the uppermost line. A method of superimposing (embedding) the imaging time information by changing the pixel values of several pixels in this region 902 is not particularly limited. For example, when an imaging time indicates P:Q:(X/10+Y/100+Z/1000), the pixel value of the first pixel of the pixel group that forms the region 902 is updated to a numerical value P, and that of the second pixel is updated to a numerical value Q. Furthermore, the pixel value of the third pixel is updated to a numerical value X, that of the fourth pixel is updated to a numerical value Y, and that of the fifth pixel is updated to a numerical value Z. As a result, using the first five pixels of the region 902, the imaging time information can be embedded in the physical space image 901. Upon displaying the region 902 or the uppermost line, it is displayed using, for example, black pixels.

The 3D position and orientation sensor 105 is used to measure the position and orientation of itself, and includes a gyro sensor, acceleration sensor, and magnetic sensor. Since the 3D position and orientation sensor 105 is used to measure the position and orientation of the viewpoint (the imaging unit 103 in this case) of the user of the VHMD 101, it is attached to the VHMD 101 to be located near the position of the imaging unit 103. Of course, when the position/orientation relationship between the imaging unit 103 and 3D position and orientation sensor 105 is measured in advance, the position and orientation of the imaging unit 103 (viewpoint) can be calculated by adding the position/orientation relationship to the measurement result of the 3D position and orientation sensor 105.

Note that the gyro sensor detects rotations in the three, that is, X, Y, and Z directions of the VHMD 101, the acceleration sensor detects translational operations in the three, that is, X, Y, and Z directions of the VHMD 101, and the magnetic sensor detects 3D position coordinates X, Y, and Z and orientation of the VHMD 101. Assume that these sensors output the measurement results at the same timing. The 3D position and orientation sensor 105 outputs position and orientation information indicating the position and orientation of the viewpoint to the image processing apparatus 102 via the I/F 106.

The image composition unit 111 generates a composition image by compositing a physical space image received from the imaging unit 103 and a virtual space image received from the image processing apparatus 102 via the I/F 106. The image composition unit 111 outputs the generated composition image to the display unit 104. Then, the composition image of the physical space image and virtual space image is displayed on the display screen of the display unit 104.

The image composition unit 111 calculates a result (difference) by subtracting a time indicated by the imaging time information received from the imaging unit 103 together with the physical space image from a generation completion predicted time (to be described later) received from the image processing apparatus 102 via the I/F 106. Then, the image composition unit 111 calculates, as difference information, a result by multiplying the calculated difference by a ratio less than 100%. The image composition unit 111 outputs the calculated difference information to the image processing apparatus 102 via the I/F 106.

The I/F 106 and an I/F 107 (to be described later) may be wired I/Fs such as wired USB or IEEE1394 metal lines, or Gigabit Ethernet™ optical fibers, or wireless I/Fs including optical communications.

The image processing apparatus 102 will be described below. As shown in FIG. 1, the image processing apparatus 102 includes the I/F 107, a line-of-sight position prediction unit 108, a CG generation unit 110, and a contents DB (database) 109.

Upon reception of an information group (the position and orientation information and difference information) transmitted from the VHMD 101 via the I/F 107, the line-of-sight position prediction unit 108 operates as follows. The line-of-sight position prediction unit 108 updates difference information by subtracting the currently received difference information from that (an initial value in the first processing) used in processing of an immediately preceding (previous) frame. The line-of-sight position prediction unit 108 then calculates, as a generation completion predicted time, a time elapsed from the reception time of these pieces of information by the line-of-sight position prediction unit 108 by a time indicated by the updated difference information. Then, the line-of-sight position prediction unit 108 predicts the position and orientation of the viewpoint at the generation completion predicted time based on the position and orientation information received from the VHMD 101. Since a technique for such prediction is known, a description thereof will not be given here. Note that the generation completion predicted time originally indicates a time at which a virtual space image generated on the image processing apparatus 102 side is composited by the image composition unit 111 included in the VHMD 101.

However, a time required for the 3D position and orientation sensor 105 to acquire the position and orientation information and to output the acquired position and orientation information to the line-of-sight position prediction unit 108 via the I/Fs 106 and 107 is about several μs. Also, a time required until the virtual space image generated by the CG generation unit 110 is output to the image composition unit 111 via the I/Fs 107 and 106 is about several hundred μs. That is, these two times can be ignored since they are very small compared to a time required by various processes executed to generate the virtual space image and to output it to the image composition unit 111. Therefore, the generation completion predicted time can be a time obtained by adding the total time of a processing time required for the line-of-sight position prediction unit 108 and that required for the CG generation unit 110 to the reception time of the position and orientation information by the line-of-sight position prediction unit 108.

When the distance between the VHMD 101 and image processing apparatus 102 is large, since a time required until the image composition unit 111 receives the virtual space image generated by the CG generation unit 110 becomes longer, a predetermined value may be added to the generation completion predicted time. The predetermined value to be added may be set based on a user instruction or may be calculated by the line-of-sight position prediction unit 108 according to the distance between the VHMD 101 and image processing apparatus 102.

As described above, the virtual space image is delayed from the physical space image by the time required from acquisition of the position and orientation information by the 3D position and orientation sensor 105 until completion of generation of the virtual space image by the CG generation unit 110. The system according to this embodiment predicts the motion of the HMD user 2101, and acquires a virtual space image based on the position and orientation information acquired by the 3D position and orientation sensor 105 at a time that nearly matches the imaging time of a physical space image by the imaging unit 103. Then, the system composites the physical space image and virtual space image at nearly the same times to present a composition image that maintains high sense of reality. More specifically, the time required for the line-of-sight position prediction unit 108 is about 10 several ms. Also, the time required for the CG generation unit 110 largely depends on the size of a virtual space image to be generated, and varies to a range from about 10 to several hundred ms.

The line-of-sight position prediction unit 108 outputs information indicating the generation completion predicted time and the predicted position and orientation information of the viewpoint to the CG generation unit 110.

The contents DB 109 registers data associated with each virtual object which configures a virtual space. For example, when a virtual object is defined by polygons, data associated with one virtual object includes normal vector data and color data of respective polygons, coordinate value data of respective vertices that define one polygon, and layout position and orientation data of the virtual object.

Figure 13:
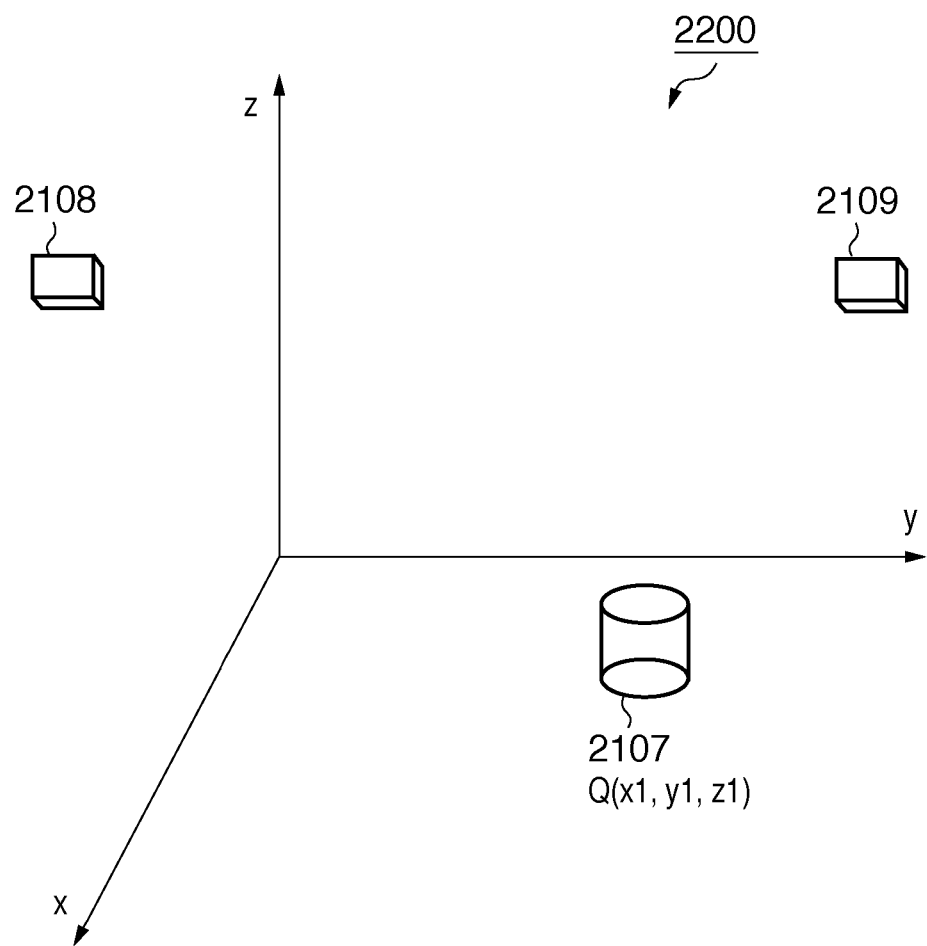
FIG. 13 is a view for explaining information registered in a contents DB 109.

FIG. 13 is a view for explaining information registered in the contents DB 109. Reference numeral 2200 denotes a virtual space defined using data registered in the contents DB 109. Reference numerals 2107, 2108, and 2109 respectively denote virtual objects that configure the virtual space. The position of each virtual object is given as a position Q(x1, y1, z1) of its center in case of, for example, the virtual object 2107.

The CG generation unit 110 constructs the virtual space exemplified in FIG. 13 using the data registered in the contents DB 109. Then, the CG generation unit 110 generates an image of the virtual space viewed from the viewpoint having the position and orientation indicated by the position and orientation information received from the line-of-sight position prediction unit 108. Since a generation method of an image of a virtual space viewed from a viewpoint having a predetermined position and orientation is a state-of-the-art technique, a description thereof will not be given.

Figure 10:
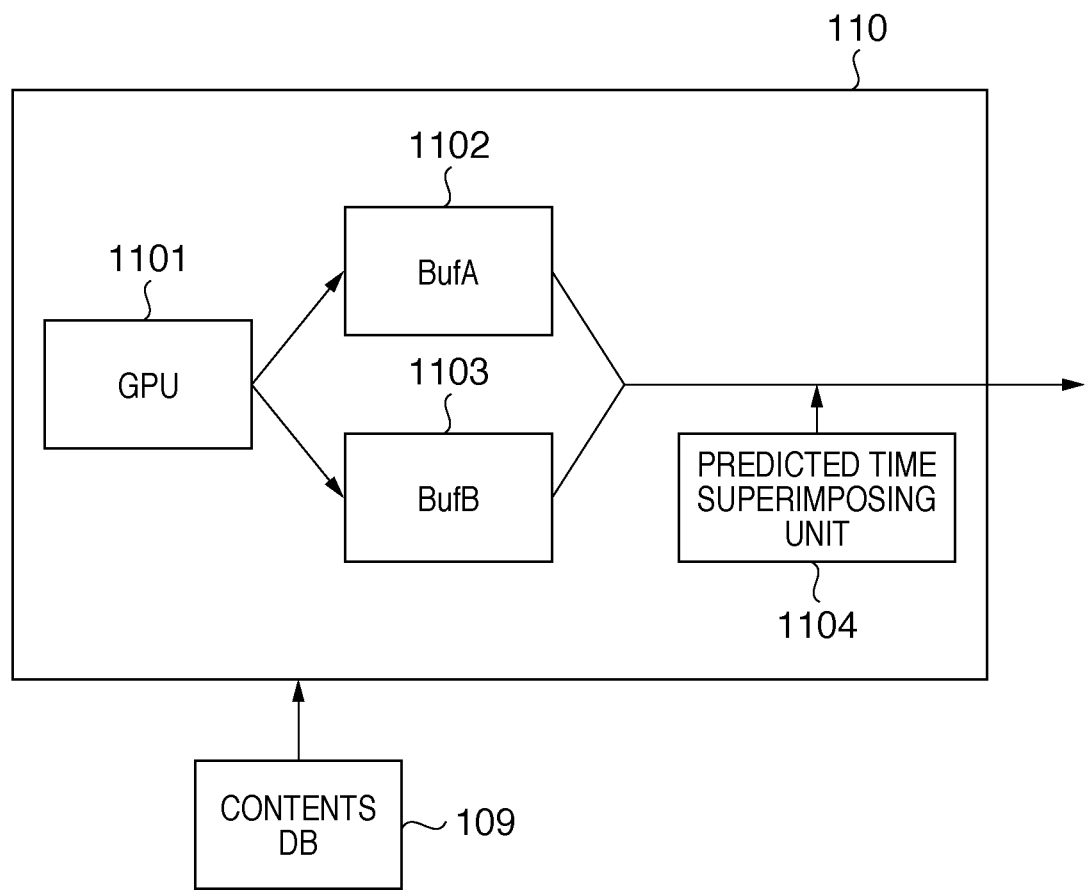
FIG. 10 is a block diagram showing an example of the internal arrangement of a CG generation unit 110.

FIG. 10 is a block diagram showing an example of the internal arrangement of the CG generation unit 110. As shown in FIG. 10, the CG generation unit 110 includes a graphic processing unit (GPU) 1101, buffer unit A (BufA) 1102 and buffer unit B (BufB) 1103 including memories, and predicted time superimposing unit 1104.

The GPU 1101 constructs a virtual space using the data group registered in the contents DB 109, and generates, as a virtual space image, an image that can be viewed when the constructed virtual space is viewed from the viewpoint having the position and orientation indicated by the position and orientation information received from the line-of-sight position prediction unit 108. The GPU 1101 alternately outputs the generated virtual space image to the BufA 1102 and BufB 1103 for each frame. The BufA 1102 and BufB 1103 output images from the latest virtual space image. That is, the BufA 1102 and BufB 1103 alternately output virtual space images.

The predicted time superimposing unit 1104 superimposes information indicating the generation completion predicted time calculated by the line-of-sight position prediction unit 108 on the virtual space image output from the BufA 1102 or BufB 1103. This superimposing processing is executed in the same manner as in the processing for superimposing the imaging time information on the physical space image by the imaging unit 103. However, when the CG generation unit 110 outputs the virtual space image and generation completion predicted time, this output mode is not limited to such specific superimposing processing as in the imaging unit 103.

The CG generation unit 110 outputs the virtual space image superimposed with the generation completion predicted time to the VHMD 101 via the I/F 107.

In addition to the imaging unit 103 and display unit 104, the image composition unit 111 and CG generation unit 110 are controlled to synchronously operate, and output 60 frame images per sec. The 3D position and orientation sensor 105 is synchronized with image acquisition, and outputs position and orientation information 60 times per sec.

Figure 8:
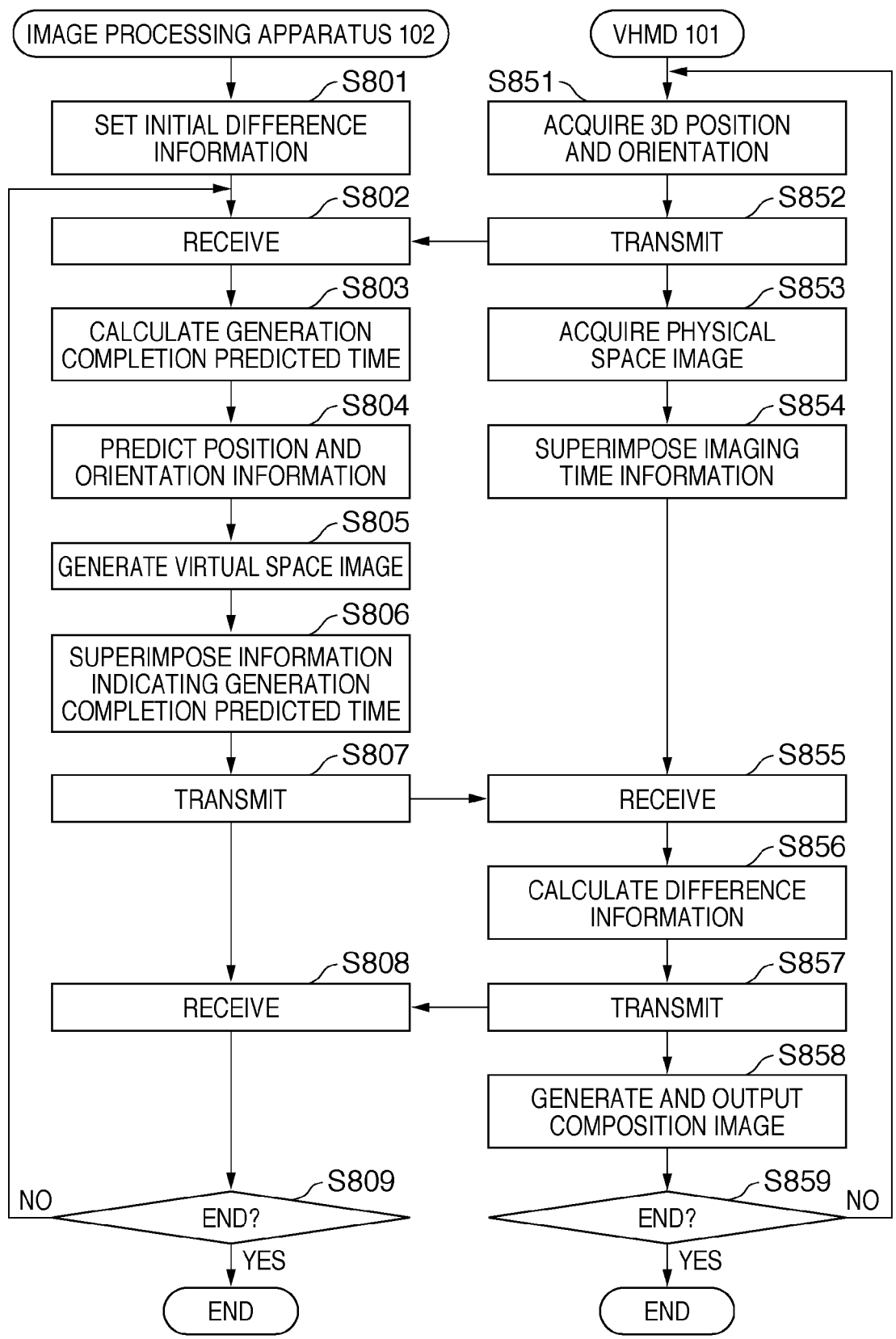
FIG. 8 is a flowchart of processing to be executed by the image processing apparatus 102 and VHMD 101.

FIG. 8 is a flowchart of the processing to be executed by the image processing apparatus 102 and VHMD 101.

In step S801, the line-of-sight position prediction unit 108 reads out an initial value of difference information, which is registered in advance in a memory (not shown) included in the image processing apparatus 102, and sets the readout value as an initial value of the subsequent processing. For example, the line-of-sight position prediction unit 108 sets, as an initial value of the difference information, 26 ms as the total time of a processing time=16 ms required for the line-of-sight position prediction unit 108 as a nonnegligible amount as the processing time, and a processing time=10 ms required for the CG generation unit 110 to generate a relatively small CG.

In step S851 the 3D position and orientation sensor 105 included in the VHMD 101 measures the position and orientation of itself to acquire the measurement result as position and orientation information.

In step S852, the 3D position and orientation sensor 105 outputs the acquired position and orientation information to the image processing apparatus 102 via the I/F 106.

In step S802, the line-of-sight position prediction unit 108 receives the position and orientation information output in step S852 via the I/F 107.

In step S803, the line-of-sight position prediction unit 108 calculates, as a generation completion predicted time, a time elapsed from the reception time of the position and orientation information in step S802 by a time indicated by the difference information set in step S801.

In step S804, the line-of-sight position prediction unit 108 predicts the position and orientation of the viewpoint at the generation completion predicted time calculated in step S803 based on the position and orientation information received in step S802.

In step S805, the CG generation unit 110 constructs a virtual space using the data registered in the contents DB 109. Then, the CG generation unit 110 generates an image of the virtual space that can be viewed from the viewpoint having the position and orientation indicated by the position and orientation information calculated by the line-of-sight position prediction unit 108 in step S804.

In step S806, the CG generation unit 110 superimposes information indicating the generation completion predicted time calculated in step S803 on the virtual space image generated in step S805.

In step S807, the CG generation unit 110 outputs the virtual space image superimposed with the generation completion predicted time to the VHMD 101 via the I/F 107.

On the other hand, in step S853 the imaging unit 103 senses an image of a physical space to acquire a physical space image, and measures this imaging time.

In step S854, the imaging unit 103 superimposes imaging time information indicating the imaging time of the physical space image on the sensed physical space image.

In step S855, the image composition unit 111 receives the "virtual space image superimposed with the generation completion predicted time" transmitted from the image processing apparatus 102 in step S807.

In step S856, the image composition unit 111 reads the imaging time information superimposed on the physical space image in step S854. The image composition unit 111 reads the generation completion predicted time superimposed on the virtual space image received in step S855. The image composition unit 111 calculates a difference by subtracting the imaging time information from the read generation completion predicted time. Then, the image composition unit 111 calculates, as difference information, a result by multiplying the calculated difference by a ratio less than 100%. For example, the image composition unit 111 calculates a time half of the calculated difference as the difference information.

For example, assume that a time required for the CG generation unit 110 to generate a virtual space image amounts to 60 ms, which are longer by 40 ms than 20 ms assumed at the time of the initial setting. In this case, since this generated virtual space image is transferred to the image composition unit 111 at a frequency of 60 Hz, a dynamic registration error of about 50 ms for three frames of images updated at 60 Hz is generated between the imaging time of the physical space image and this virtual space image to be composited. Hence, in this case, the image composition unit 111 transmits 25 ms half of the dynamic registration error amount=50 ms as the difference information to the line-of-sight position prediction unit 108. Note that the half of the error amount is used as the difference information in this case. However, the time required for the virtual space image generation processing as one factor that largely influences the error amount depends on the data stored in the contents DB 109 and the motion speed of the HMD user 2101. Therefore, the ratio to be multiplied to the error amount is not limited to the half (50%), and may be set to be 5%, 10%, 25%, and the like according to the amount of the data (for example, the sizes and complexities of virtual objects) registered in the contents DB 109 and the use state of the HMD user 2101. In general, when this ratio is set to be excessively high, the processing oscillates. Therefore it is better to set to not be so high.

In step S857, the image composition unit 111 transmits the difference information calculated in step S856 to the image processing apparatus 102 via the I/F 106.

In step S808, upon reception of the difference information transmitted by the image composition unit 111 in step S857, the line-of-sight position prediction unit 108 updates the difference information by subtracting the currently received difference information from the difference information (an initial value in the first processing) used at the time of processing of an immediately preceding frame. The line-of-sight position prediction unit 108 sets the updated difference information as difference information to be used in the next processing. That is, in step S803 for the next frame, the line-of-sight position prediction unit 108 calculates, as a generation completion predicted time, a time elapsed from the reception time of the position and orientation in step S802 by a time indicated by the difference information updated in step S808.

If the end condition of this processing is satisfied, or if an end instruction of this processing is externally input, this processing ends via step S809. On the other hand, if the end condition of this processing is not satisfied and the end instruction of this processing is not externally input, the process returns to step S802 via step S809 to execute the subsequent processes so as to generate a virtual space image for the next frame.

In step S858 the image composition unit 111 generates a composition image by compositing the physical space image generated in step S854 and the virtual space image received from the image processing apparatus 102 in step S807. The image composition unit 111 then outputs the generated composition image to the display unit 104. Of course, as described above, pixels embedded with the information are displayed using black pixels or only a line of pixels embedded with the information is not displayed, thus taking appropriate measures.

If the end condition of this processing is satisfied, or if an end instruction of this processing is externally input, this processing ends via step S859. On the other hand, if the end condition of this processing is not satisfied and the end instruction of this processing is not externally input, the process returns to step S851 via step S859 to execute the subsequent processes so as to generate a composition image for the next frame.

According to the aforementioned processing of this embodiment, until the image composition unit 111 composites the virtual space image generated by the CG generation unit 110 to the physical space image, a time for one or more frames is required. For this reason, difference information is supplied to the line-of-sight position prediction unit 108, and a virtual space image that reflects this difference information is generated by the CG generation unit 110 two frames later. However, since a display image is updated at a rate of 60 frames per sec, even when the HMD user 2101 makes somewhat quicker motions, it can be assumed that the virtual space images do not largely change between frames. For this reason, by repeating the aforementioned processing, a dynamic registration error between the physical space image and virtual space image can be almost removed.

Second Embodiment

In the first embodiment, a dynamic registration error between the virtual space image and physical space image is calculated using the imaging time and generation completion predicted time. In this embodiment, this dynamic registration error is calculated using a count value of a counter provided inside the line-of-sight position prediction unit 108. Assume that this counter operates to count at a frequency of 60 Hz as an image frame rate. Also, in this embodiment, assume that the 3D position and orientation sensor 105 operates at a frequency twice the image frame rate, that is, 120 Hz. Of course, the 3D position and orientation sensor 105 acquires position and orientation information for each frame image (in synchronism with an image).

Note that only differences of this embodiment from the first embodiment will be explained below.

Figure 5:
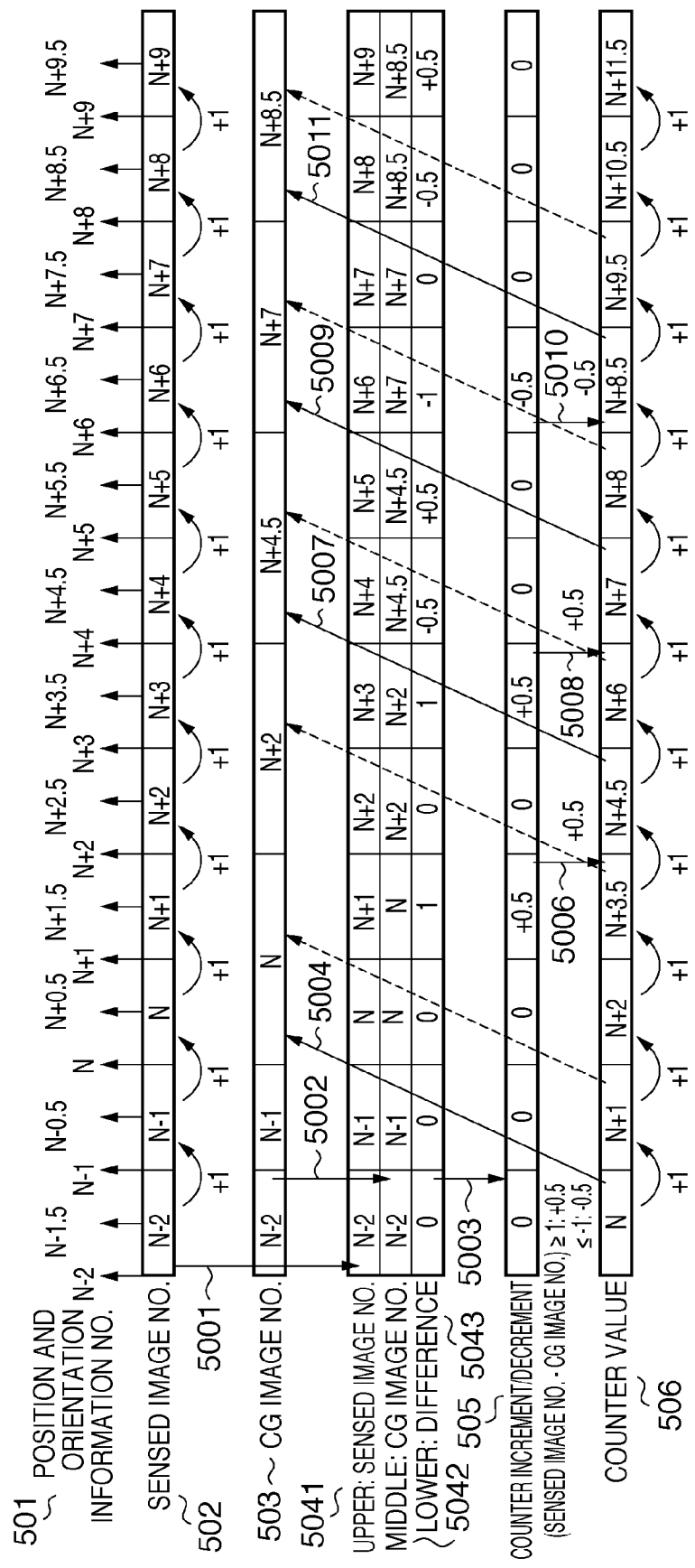
FIG. 5 is a chart for explaining processing for generating a virtual space image to be composited on a physical space image so as to eliminate a dynamic registration error in the second embodiment of the present invention.

FIG. 5 is a chart for explaining processing for generating a virtual space image to be composited to a physical space image so as to eliminate a dynamic registration error in this embodiment. In the following description, for the sake of simplicity, a counter for an imaging unit 103 increments a count value managed by itself by 1 every time a physical space image is sensed. Also, a counter for a line-of-sight position prediction unit 108 increments a count value managed by itself by 1 every time position and orientation information is output (every time a virtual space image is generated). Assume that both the imaging unit 103 (to sense a physical space image) and line-of-sight position prediction unit 108 (to output position and orientation information) operate at a frame of 60 Hz. A counter for a 3D position and orientation sensor 105 increments a count value managed by itself by 0.5 (½) every time the position and orientation information is measured. Assume that the 3D position and orientation sensor 105 operates at a rate of 120 Hz.

In FIG. 5, the abscissa plots time, which elapses in the right direction of the plane of the figure. Also, in FIG. 5, "N" is a natural number.

Referring to FIG. 5, reference numeral 502 denotes a number (sensed image No.) assigned to each physical space image sensed by the imaging unit 103, that is, a count value of a counter which increments the count value by 1 every time the imaging unit 103 senses an image. Assume that this counter is included in the imaging unit 103.

Reference numeral 501 denotes a number (position and orientation information No.) assigned to each position and orientation information measured by the 3D position and orientation sensor 105, that is, a count value of a counter which increments the count value by 0.5 every time the 3D position and orientation sensor 105 performs measurement. Assume that this counter is included in the 3D position and orientation sensor 105.

Reference numeral 503 denotes a number (CG image No.) assigned to each virtual space image generated by a CG generation unit 110, that is, a count value of a counter which increments the count value by 1 every time the CG generation unit 110 generates a virtual space image. Assume that this counter is included in the line-of-sight position prediction unit 108. As described in the first embodiment, the CG generation unit 110 outputs a virtual space image which is written last of those written in a BufA 1102 and BufB 1103. Therefore, the count value for a virtual space image has a delay for two frames from the count value by the line-of-sight position prediction unit 108.

As described above, when the imaging unit 103 senses a physical space image, it superimposes the count value counted by the counter at the time of sensing of this physical space image on the physical space image, and outputs the physical space image superimposed with the count value to an image composition unit 111. The superimposing method is the same as that in the first embodiment.

On the other hand, an image processing apparatus 102 outputs a virtual space image via an I/F 106. On this virtual space image, the count value counted by the counter at the time of generation of this virtual space image is superimposed. This virtual space image is input to the image composition unit 111. Then, the image composition unit 111 generates a composition image by compositing the physical space image and virtual space image, as described in the first embodiment. On the other hand, the image composition unit 111 reads the count value superimposed on the physical space image, and reads the count value superimposed on the virtual space image.

In FIG. 5, reference numeral 5041 denotes a count value read from the physical space image; and 5042, a count value read from the virtual space image. The image composition unit 111 calculates, as difference information, a result by subtracting the count value read from the virtual space image from that read from the physical space image. In FIG. 5, reference numeral 5043 denotes difference information.

In FIG. 5, reference numeral 505 denotes a correction result of the difference information by the image composition unit 111. If the difference information is 1 or more, the image composition unit 111 corrects it to 0.5. If the difference information is −1 or less, the image composition unit 111 corrects it to −0.5. If the difference information is larger than −1 and less than 1, the image composition unit 111 corrects it to 0.

A VHMD 101 outputs the position and orientation information, the count value for this position and orientation information, and the corrected difference information to the image processing apparatus 102 via the I/F 106.

Reference numeral 506 denotes a count value (counter value) by the line-of-sight position prediction unit 108. The line-of-sight position prediction unit 108 increments the count value managed by itself by 1, and then adds, to this incremented count value, the corrected difference information received from the VHMD 101 via an I/F 107. The count value (count result) 506 is obtained after this addition. The line-of-sight position prediction unit 108 manages the count value after addition, which is to be incremented in the next processing.

Figure 6:
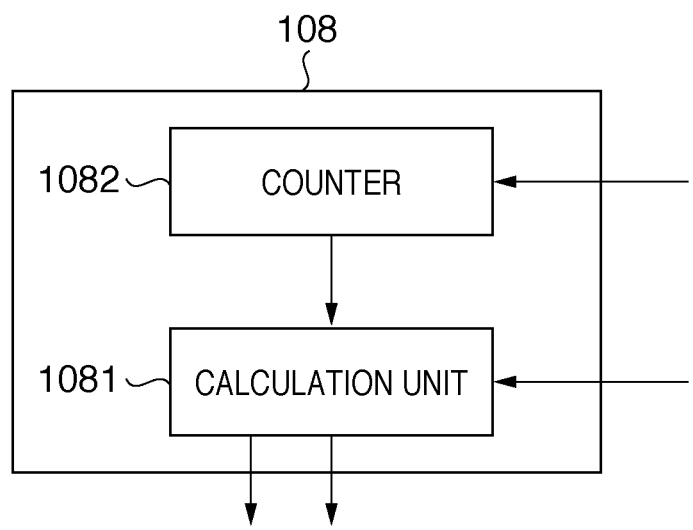
FIG. 6 is a block diagram showing an example of the internal arrangement of a line-of-sight position prediction unit 108.

FIG. 6 is a block diagram showing an example of the internal arrangement of the line-of-sight position prediction unit 108.

As shown in FIG. 6, the line-of-sight position prediction unit 108 includes a counter 1082 and calculation unit 1081. The counter 1082 increments a count value managed by itself by 1, and then adds the corrected difference information received from the VHMD 101 via the I/F 107 to the incremented count value. The counter 1082 outputs the updated count value to the subsequent calculation unit 1081. The calculation unit 1081 specifies the position and orientation information previously received from the VHMD 101 together with a count value having the same value as that received from the counter 1082, and outputs the specified position and orientation information and the count value received from the counter 1082 to the subsequent CG generation unit 110.

The operation of the CG generation unit 110 is the same as that in the first embodiment, except for information to be superimposed on a virtual space image.

In FIG. 5, until a physical space image with a count value N, there is no dynamic registration error between a physical space image and virtual space image. However, since an HMD user 2101 has changed the line-of-sight direction, a virtual object with a large size has to be rendered. Consequently, virtual space images cannot be generated at 60 Hz from a virtual space image with a count value N, and can only be generated at a frequency of 30 Hz. This case will be explained below.

Since the CG generation unit 110 has spent much time for generation of the virtual space image with the count value N, it cannot generate a virtual space image with a count value (N+1) within a 1-frame period. For this reason, the virtual space image with the count value N is transferred to the image composition unit 111 for two consecutive frames, as indicated by an arrow 5004. Since an image to be composited to a physical space image with a count value (N+1) is the virtual space image with the count value N, a difference value 5043 assumes 1, and 0.5 are added to the count value 506 to obtain (N+3.5) as the count value 506, as indicated by an arrow 5006. However, a virtual space image based on position and orientation information corresponding to the count value (N+3.5) is not output to the image composition unit 111 since a time required to generate an immediately preceding virtual space image with a count value (N+2) is too long. For this reason, 0.5 are further added to the count value 506, as indicated by an arrow 5008.

Next, a virtual space image to be composited to physical space images with count values (N+4) and (N+5) is that based on position and orientation information corresponding to a count value (N+4.5), as indicated by an arrow 5007. As a result, difference values 5043 of the count values (N+4) and (N+5) are respectively −0.5 and 0.5, and the correction results of both the difference values are 0.

Then, a virtual space image to be composited to physical space images with count values (N+6) and (N+7) is that based on position and orientation information corresponding to a count value (N+7), as indicated by an arrow 5009. As a result, as indicated by an arrow 5010, a difference value 5043 of the count value (N+6) is −1, and its correction result is −0.5. Also, a difference value 5043 of the count value (N+7) is 0, and its correction result is 0.

Furthermore, a virtual space image to be composited to physical space images with count values (N+8) and (N+9) is that based on position and orientation information corresponding to a count value (N+8.5), as indicated by an arrow 5011. As a consequence, difference values 5043 of the count values (N+8) and (N+9) are respectively −0.5 and 0.5, and the correction results of both the difference values are 0.

After that, by repeating the feedback processing using the count value 506, a dynamic registration error between the physical space image and virtual space image is kept corrected.

In the above description, the number of bits of the counter is not particularly specified. As described above, a time required to generate a virtual space image depends on the amount of data stored in a contents DB 109. Therefore, a longest time required to generate a virtual space image is predicted based on the amount of data stored in the contents DB 109, and a counter which has the number of bits according to that longest time may be used. More specifically, if 0.25 sec are required to generate a virtual space image to be displayed on a full display region, since this time corresponds to 15 frames of 60 fps, a 6-bit counter suffices even considering a margin.

In the above description, the detection frequency of the 3D position and orientation sensor 105 is twice the image frame rate. However, the detection frequency of the 3D position and orientation sensor 105 may be lower than the image frame rate or may be four times or more the image frame rate. Since the sense of reality of a composition image can be enhanced when the detection frequency of the 3D position and orientation sensor 105 is higher than the image frame rate, it is better that a detection frequency of the 3D position and orientation sensor 105 is higher.

Third Embodiment

In the first embodiment, the video see-through HMD is used as the head mounted display. In this embodiment, an optical see-through HMD is used as the head mounted display. Only differences of this embodiment from the first embodiment will be described below.

Figure 7:
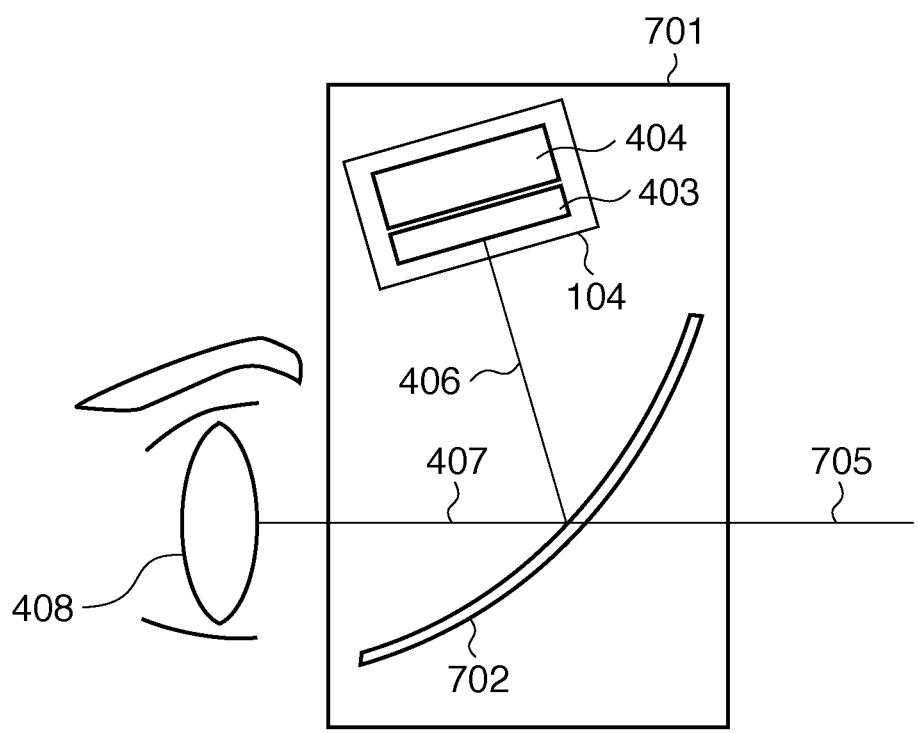
FIG. 7 is a side sectional view showing an example of the internal arrangement of an optical see-through head mounted display (OHMD)

FIG. 7 is a side sectional view showing an example of the internal arrangement of an optical see-through HMD (OHMD). The same reference numerals in FIG. 7 denote the same parts as in FIG. 4, and a repetitive description thereof will be avoided.

Reference numeral 702 denotes a half mirror, which mixes a light beam 705 from a physical space and a light beam 406 from a display unit 104, and forms an image on an eye 408 of an HMD user 2101 as a light beam 407 of a composition image.

Figure 2:
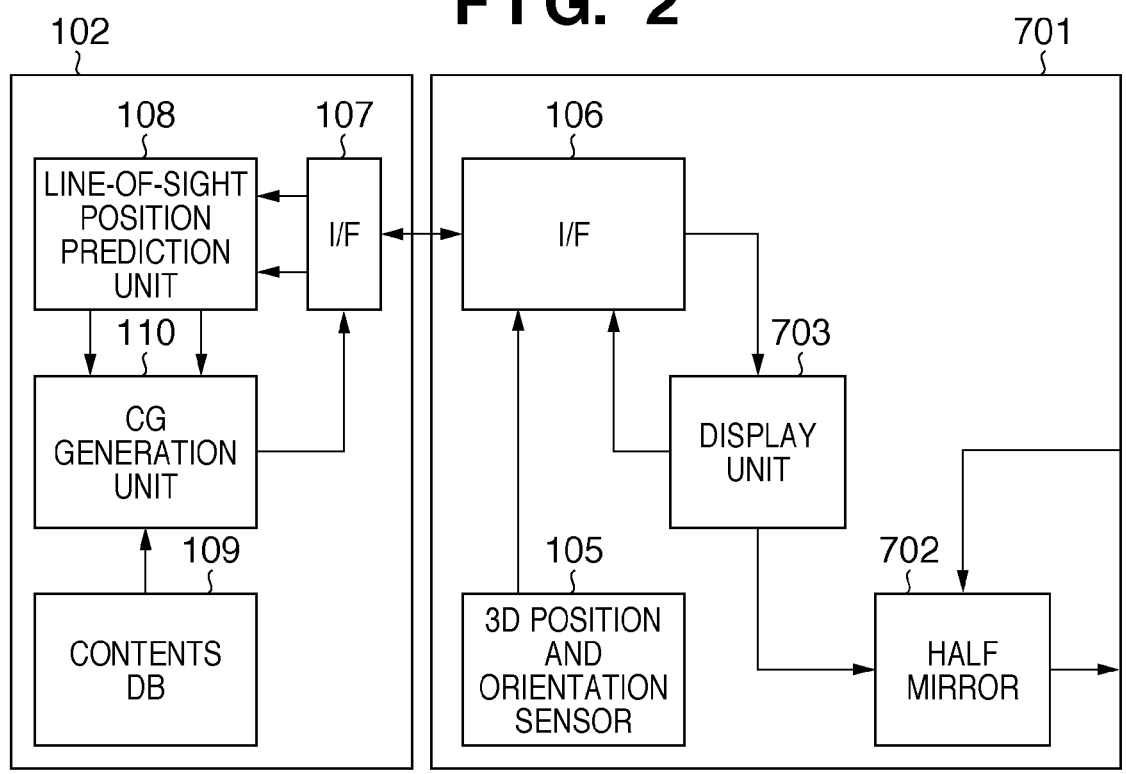
FIG. 2 is a block diagram showing an example of the functional arrangement of a system according to the third embodiment of the present invention.

FIG. 2 is a block diagram showing an example of the functional arrangement of a system according to this embodiment. The same reference numerals in FIG. 2 denote the same parts as in FIG. 1, and a repetitive description thereof will be avoided. The system according to this embodiment includes an image processing apparatus 102 and an OHMD 701. Since the image processing apparatus 102 is the same as that in the first embodiment, only the OHMD 701 will be explained.

As shown in FIG. 2, the OHMD 701 includes the half mirror 702, an I/F 106, a display unit 703, and a 3D position and orientation sensor 105.

The display unit 703 calculates a result (difference) by subtracting a current time measured by itself from a generation completion predicted time superimposed on a virtual space image received from the image processing apparatus 102 via the I/F 106. The display unit 703 calculates, as difference information, a result by multiplying the calculated difference by a ratio less than 100%. The display unit 703 then outputs the calculated difference information to the image processing apparatus 102 via the I/F 106. The display unit 703 displays that virtual space image on a liquid crystal screen of itself to irradiate the half mirror 702 with this displayed image as a light beam.

Figure 11:
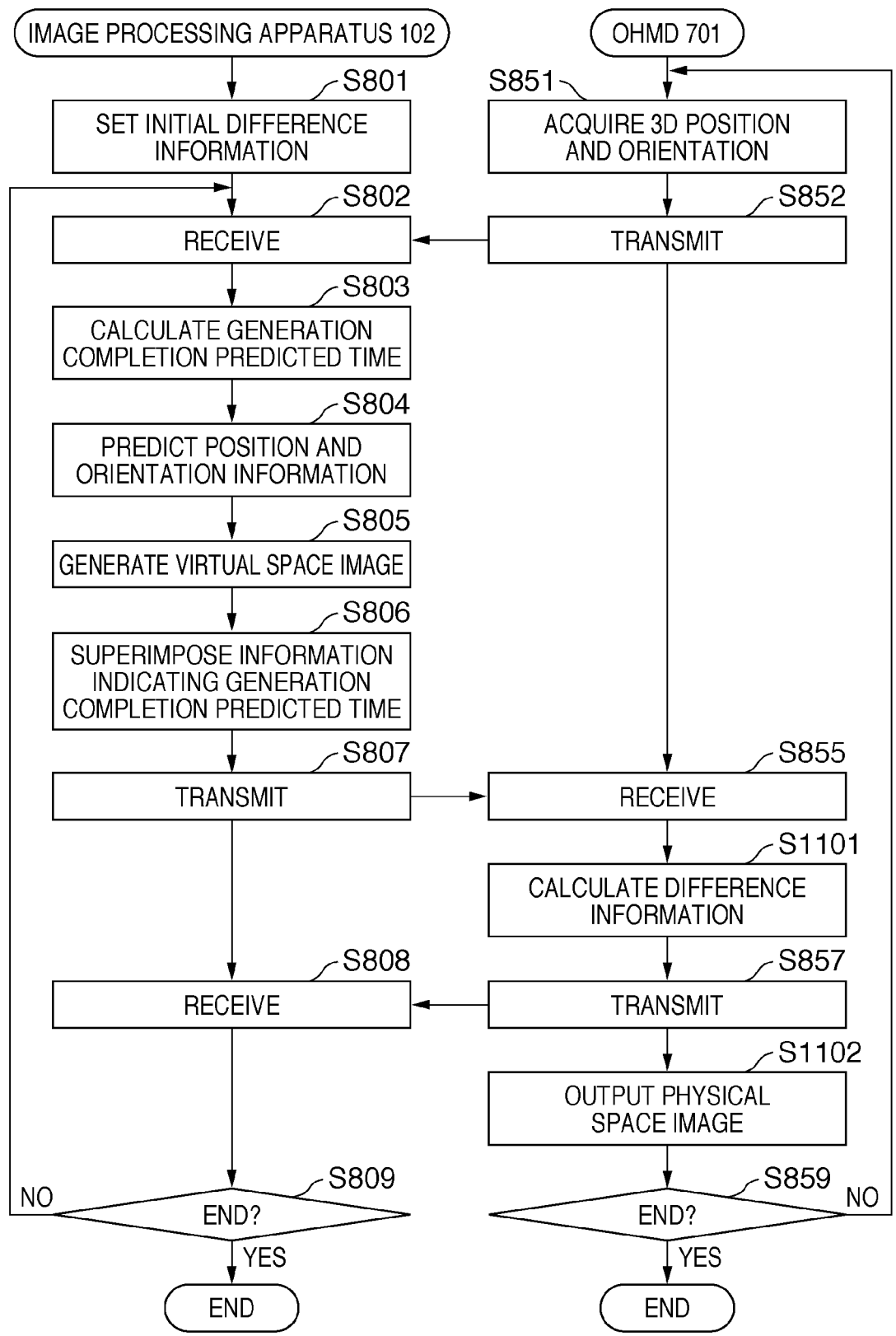
FIG. 11 is a flowchart of processing to be executed by the image processing apparatus 102 and OHMD 701.

FIG. 11 is a flowchart of processing to be executed by the image processing apparatus 102 and OHMD 701. The same step numbers in FIG. 11 denote the same steps as in FIG. 8, and a repetitive description thereof will be avoided. Since the processing to be executed by the image processing apparatus 102 is the same as that in the first embodiment, only the processing to be executed by the OHMD 701 will be explained below.

In step S1101, the display unit 703 calculates a difference by subtracting a current time measured by itself from a generation completion predicted time superimposed on a virtual space image received in step S855. The display unit 703 calculates, as difference information, a result by multiplying the calculated difference by a ratio less than 100%. For example, the display unit 703 calculates a time half of the calculated difference as the difference information. In step S857, the display unit 703 transmits this difference information to the image processing apparatus 102.

In step S1102, the display unit 703 displays the virtual space image received in step S855 on the liquid crystal screen of itself, thereby irradiating the half mirror 702 with the displayed image as a light beam.

In this embodiment as well, the second embodiment can be applied. That is, the method of correcting an error between the generation completion predicted time and current time using a count value counted at the frequency of 60 Hz as an image frame rate can be used.

Fourth Embodiment

The first and second embodiments have been explained using the method of superimposing information associated with a time on an image. However, the information associated with a time may be transferred independently of an image.

In the first and second embodiments, a 3D position and orientation sensor 105 is used to detect the position and orientation of the viewpoint of an HMD user 2101. However, the measurement of the position and orientation of the viewpoint is not limited to such specific method. For example, a known technique which lays out indices all having different filled patterns on a physical space to have appropriate allocations, senses an image including these indices using an imaging unit 103, and calculates the position and orientation of the viewpoint using the sensed image may be used.

Figure 12:
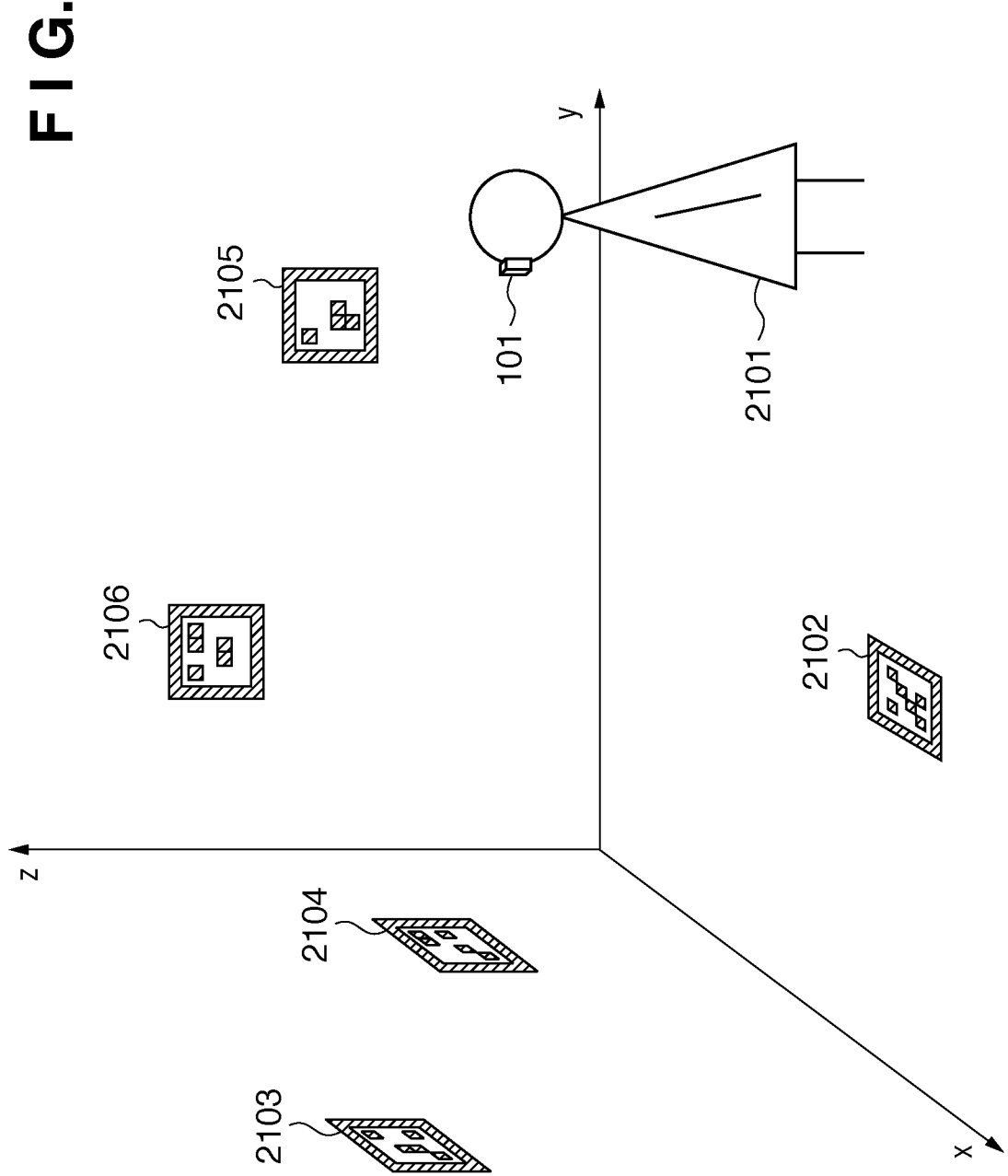
FIG. 12 is a view for explaining processing for calculating the position and orientation of a viewpoint using indices.

FIG. 12 is a view for explaining processing for calculating the position and orientation of the viewpoint using indices. As shown in FIG. 12, indices 2102 to 2106 whose coordinates and directions are specified in advance are laid out on the physical space to which the HMD user 2101 belongs to have appropriate allocations. All of these indices 2102 to 2106 have different filled patterns (to be referred to as index patterns hereinafter), and each individual index can be specified based on the index pattern. Hence, by analyzing an index region in a physical space image obtained by sensing an image of this physical space using the imaging unit 103 included in a VHMD 101, the position and orientation of the viewpoint of the HMD user 2101 are calculated. Also, the position and orientation of the viewpoint of the HMD user 2101 may be calculated using the method of calculating the position and orientation of the viewpoint of the HMD user 2101 by analyzing the index region, and the method of calculating the position and orientation of the viewpoint using the 3D position and orientation sensor 105 together.

Furthermore, in the first, second, and third embodiments described above, a virtual space image is generated according to the position and orientation of the viewpoint of the HMD user 2101 after a predicted time, and is composited to a physical space image. For this reason, when a prediction error occurs, a spatial error is generated between the physical space image and virtual space image, and the sense of reality may be impaired. In such case, by shifting the composition position of the virtual space image in the horizontal and vertical directions upon compositing the physical space image and virtual space image, any loss in sense of reality due to the prediction error may be complemented.

Fifth Embodiment

Figure 3:
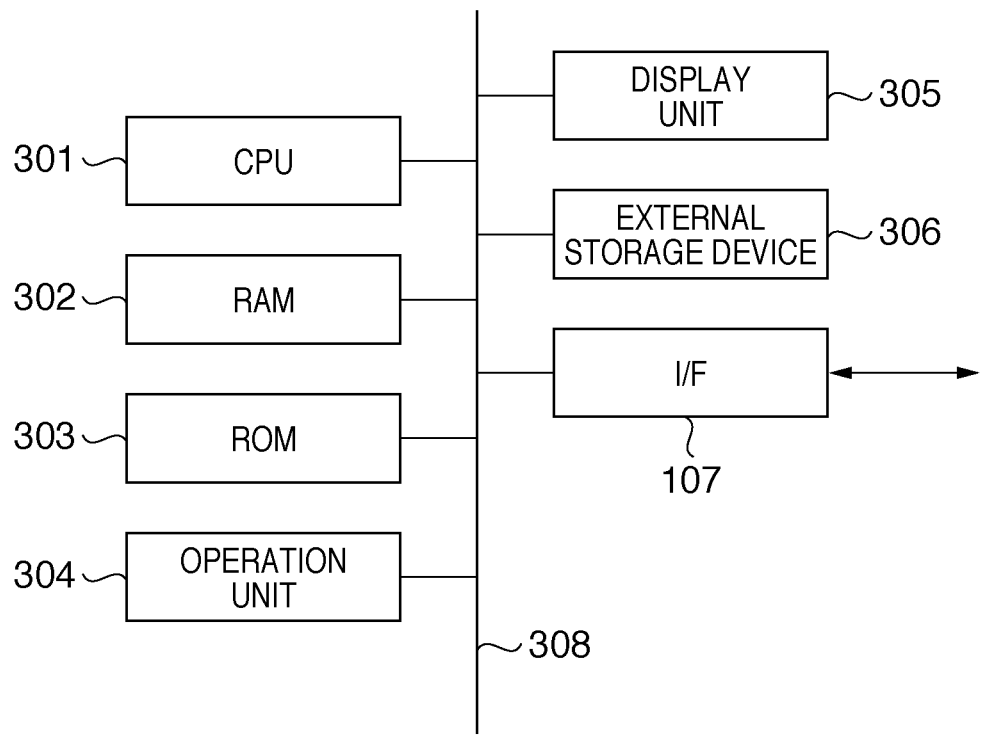
FIG. 3 is a block diagram showing an example of the hardware arrangement of a computer applicable to an image processing apparatus 102.

A computer such as a PC may be applied to an image processing apparatus 102. FIG. 3 is a block diagram showing an example of the hardware arrangement of a computer applicable to the image processing apparatus 102.

A CPU 301 controls the overall computer and executes respective processes described above as those to be implemented by the image processing apparatus 102 using computer programs and data stored in a RAM 302 and ROM 303.

The RAM 302 has an area for temporarily storing computer programs and data loaded from an external storage device 306, data received from a VHMD 101 or OHMD 701 via an I/F 107, and the like. Also, the RAM 302 has a work area used when the CPU 301 executes various processes. That is, the RAM 302 can provide various areas as needed.

The ROM 303 stores setting data, a boot program, and the like of this computer.

An operation unit 304 includes a keyboard and mouse, and can input various instructions to the CPU 301 when it is operated by an operator of this computer.

A display unit 305 includes a CRT or liquid crystal display panel, and can display the processing result of the CPU 301 by means of images, characters, and the like.

An external storage device 306 is a large-capacity information storage device represented by a hard disk drive. The external storage device 306 saves an OS (operating system), and computer programs and data which make the CPU 301 execute respective processes described above as those to be implemented by the image processing apparatus 102. These computer programs include those which make the CPU 301 implement the functions of a line-of-sight position prediction unit 108 and CG generation unit 110. Also, a contents DB 109 is registered in the external storage device 306. The computer programs and data saved in the external storage device 306 are loaded onto the RAM 302 as needed under the control of the CPU 301, and are to be processed by the CPU 301.

Reference numeral 308 denotes a bus which interconnects the aforementioned units.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-198617 filed Jul. 31, 2008 which is hereby incorporated by reference herein in its entirety.

What is claimed is:
1. A mixed reality presentation system including:
 a head mounted display having an imaging unit which senses an image of a physical space, and a display unit which displays an image; and
 an image processing apparatus which generates an image to be displayed on the display unit, wherein said head mounted display comprises:
a composition unit which generates a composition image by compositing a physical space image sensed by the imaging unit and a virtual space image, the virtual space image including a virtual object and being transmitted from said image processing apparatus;
a unit which acquires position and orientation information indicating a position and orientation of a viewpoint; and
a transmission unit which transmits the acquired position and orientation information to said image processing apparatus, and said image processing apparatus comprises:
a reception unit which receives the position and orientation information transmitted by said transmission unit;
a derivation unit which derives a generation completion time of the virtual space image on the basis of amount of data of the virtual object, wherein a larger amount of data results in a later derived generation completion time;
a prediction unit which predicts a position and orientation of the viewpoint at the derived generation completion time, using the derived generation completion time and the received position and orientation information;
a generation unit which generates a virtual space image including the virtual object based on the viewpoint having the position and orientation predicted by said prediction unit; and
a unit which transmits the virtual space image generated by said
generation unit to said head mounted display.

2. The system according to claim 1, wherein the units included in said image processing apparatus and the units included in said head mounted display repeat processing for respective frames.

3. A mixed reality presentation system including:
a head mounted display having an imaging unit which senses an image of a physical space, and a display unit which displays an image; and
an image processing apparatus which generates an image to be displayed on the display unit,
wherein said head mounted display comprises:
a composition unit which generates a composition image by compositing a physical space image sensed by the imaging unit and a virtual space image transmitted from said image processing apparatus;
a unit which outputs the composition image to the display unit;
a calculation unit which calculates, as difference information, a difference between a count value of the physical space image counted by a counter which increments the count value by 1 every time the imaging unit senses an image, and a count value for the virtual space image transmitted from said image processing apparatus;
a correction unit which updates the difference information by correcting the difference information to ½ when a value indicated by the difference information is not less than 1, to −½ when the value is not more than −1, and to 0 when the value is larger than −1 and less than 1;
an acquisition unit which acquires position and orientation information from a sensor which measures a position and orientation of a viewpoint at a rate twice a frame rate of the imaging unit, and acquires a count value of the position and orientation information counted by a counter which increments the count value by ½ every time the sensor performs the measurement; and
a transmission unit which transmits the difference information updated by said correction unit, the position and orientation information, and the count value of the position and orientation information to said image processing apparatus, and said image processing apparatus comprises:
a reception unit which receives an information group transmitted from said transmission unit;
a generation unit which generates a virtual space image based on the information group received by said reception unit, and which calculates, as a count result, a count value obtained by incrementing a count value by 1 every time said generation unit generates the virtual space image, and adding the difference information received by said reception unit to the incremented count value, specifies position and orientation information received by said reception unit together with a count value having the same value as the calculated count value, and generates a virtual space image based on a viewpoint having a position and orientation indicated by the specified position and orientation information; and
a unit which transmits the virtual space image generated by said generation unit and the count value calculated as the count result by said generation unit with respect to that virtual space image to said head mounted display.

4. A mixed reality presentation system including:
a head mounted display having a display unit which displays an image; and
an image processing apparatus which generates an image to be displayed on the display unit,
wherein said head mounted display comprises:
a unit which outputs a virtual space image, the virtual space image including a virtual object and being transmitted from said image processing apparatus to the display unit;
a unit which acquires position and orientation information indicating a position and orientation of a viewpoint; and
a transmission unit which transmits the difference information and the position and orientation information to said image processing apparatus, and said image processing apparatus comprises:
a reception unit which receives the position and orientation information transmitted by said transmission unit;
a derivation unit which derives a generation completion time of the virtual space image on the basis of amount of data of the virtual object, wherein a larger amount of data results in a later derived generation completion time;
a prediction unit which predicts a position and orientation of the viewpoint at the derived generation completion time, using the derived generation completion time and the received position and orientation information;
a generation unit which generates a virtual space image including the virtual object based on the viewpoint having the position and orientation predicted by said prediction unit; and
a unit which transmits and the virtual space image generated by said generation unit to said head mounted display.

5. An image processing apparatus comprises:
a first acquisition unit which acquires position and orientation information indicating a position and orientation of a viewpoint;
a derivation unit which derives a generation completion time of a virtual space image including a virtual object, on the basis of amount of data of the virtual object, wherein a larger amount of data results in a later derived generation completion time;
a prediction unit which predicts a position and orientation of the viewpoint at the derived generation completion time, using the derived generation completion time and the acquired position and orientation information;

a generation unit which generates the virtual space image including the virtual object, based on the viewpoint having the position and orientation predicted by said prediction unit; and a unit which transmits the virtual space image generated by said generation unit to a display device.

6. A control method for controlling an image processing apparatus, the method comprising:

a first acquisition step of acquiring by the image processing apparatus, position and orientation information indicating a position and orientation of a viewpoint;

a derivation step of deriving a generation completion time of a virtual space image including a virtual object, on the basis of amount of data of the virtual object, wherein a larger amount of data results in a later derived generation completion time;

a prediction step of predicting a position and orientation of the viewpoint at the derived generation completion time, using the derived generation completion time and the acquired position and orientation information;

a generation step of generating the virtual space image including the virtual object, based on the viewpoint having the position and orientation predicted by said prediction step; and a transmitting step of transmitting the virtual space image generated by said generation step to a display device.

* * * * *